United States Patent [19]
Lundberg

[11] 3,870,662
[45] Mar. 11, 1975

[54] NOVEL FOAMED MULTIPHASE THERMOPLASTIC COPOLYMER COMPOSITIONS

[76] Inventor: Robert D. Lundberg, 4 Brian Dr., Somerville, N.J. 08876

[22] Filed: Mar. 29, 1973

[21] Appl. No.: 345,971

[52] U.S. Cl. ..... 260/2.5 R, 260/2.5 H, 260/2.5 HB, 260/2.5 HA, 260/31.8 M, 260/33.6 UA, 260/33.8 UA, 260/823, 260/835, 260/857 R, 260/860, 260/874, 260/878 R, 260/878 B, 260/881, 260/886, 260/898
[51] Int. Cl. ..... C08f 47/10, C08g 53/10, C08j 1/28
[58] Field of Search ........ 260/2.5 R, 2.5 H, 2.5 HA, 260/2.5 HB

[56] References Cited
UNITED STATES PATENTS

| | | | |
|---|---|---|---|
| 2,928,130 | 3/1960 | Gray | 260/2.5 E |
| 3,265,765 | 8/1966 | Holton et al. | 260/2.5 L |
| 3,577,357 | 5/1971 | Winkler | 260/2.5 HB |
| 3,779,954 | 12/1973 | Wirth et al. | 260/2.5 HB |

FOREIGN PATENTS OR APPLICATIONS
1,576,598   8/1969   France .............................. 260/885

*Primary Examiner*—Morton Foelak
*Attorney, Agent, or Firm*—R. J. Baran

[57] ABSTRACT

This invention relates to foamed products having foam densities from about 1 lb. to about 45 lbs./cubic foot derived from thermoplastic multiphase copolymers selected from the group consisting of copolymers represented by graft copolymers having the general formula

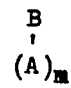

and block copolymers having the general formula x-B-(AB)$_n$-yA wherein n is an integer $\geq$ 1, m is >1, x and y are 0 or 1, and y is 1 when n is 1, A is a thermoplastic polymer block having a softening point of at least 35°C. and B is a thermoplastic polymer block having a softening point of at least 35°C. but at least 10°C. below that of the A block, and comprises from about 50 to about 97 percent of said copolymer. The novel foams of this invention are useful in the preparation of foamed sheet, pellets, and molded samples, capable of being reprocessed and yet possessing excellent dimensional stability. Preferably the thermoplastic multiphase copolymers are styrene-t-butyl block copolymers or styrene-ethylene oxide block copolymers.

10 Claims, No Drawings

NOVEL FOAMED MULTIPHASE THERMOPLASTIC COPOLYMER COMPOSITIONS

FIELD OF THE INVENTION

This invention relates to foamed products having foam densities from about 1 lb. to about 45 lbs./cubic foot derived from thermoplastic multiphase copolymers selected from the group consisting of copolymers represented by graft copolymers having the general formula $$\begin{array}{c} B \\ | \\ (A)_m \end{array}$$

and block copolymers having the general formula x-B-(AB)$_n$-yA wherein n is an integer $\geq$ 1, m is >1, x and y are 0 or 1, and y is 1 when n is 1, A is a thermoplastic polymer block having a softening point of at least 35°C. and B is a thermoplastic polymer block having a softening point of at least 35°C. but at least 10°C. below that of the A block, and comprises from about 50 to about 97 percent of said copolymer. The novel foams of this invention are useful in the preparation of foamed sheet, pellets, and molded samples, capable of being reprocessed and yet possessing excellent dimensional stability. Preferably the thermoplastic multiphase copolymers are styrene-t-butyl styrene block copolymers or styrene-ethylene oxide block copolymers.

DESCRIPTION OF THE PRIOR ART

Foamed plastics have represented one of the fastest growing markets in the polymer industry in the past 15 years. This growth is expected to continue, and it is claimed that "the potential usage of foamed plastics could far exceed the ability of the plastics industry to supply the needed materials."

There are essentially only two major flexible foam products now available in any large volume. They are polyurethane foam and plasticized poly(vinylchloride) foam. At this time, semiflexible foamed polyolefins are being commercialized for special applications; however, these do not yet represent sent large volume products. The most important rigid foamed materials are polyurethane, polystyrene and polyvinyl chloride.

Flexible and rigid polyurethane foams are normally prepared by the reaction of a diisocyanate, a hydroxyl terminated polyol, water, surfactant, catalysts, and possibly an external foaming agent. When these are intimately blended, a number of reactions occur very rapidly. In a matter of seconds a polymer is formed, expanded and cross-linked. The timing of polymerization and expansion is critical and is controlled by the catalysts, surfactants, and relative concentration of the diisocyanate and water.

The various chemical reactions which can occur are exceedingly complex and have been the subject of numerous publications and thirty years of intensive research. Furthermore, the diisocyanates employed in such studies are expensive and quite toxic, such that they can provide severe hazards to the personnel performing these reactions. It is also evident that after achieving a cured polyurethane foam, the process is irreversible. Therefore, if the resulting product does not meet specifications, it is of little or no value.

These problems are cited to demonstrate that despite almost overwhelming problems and major expense, both flexible and rigid polyurethane systems have grown to their present volume due to product performance and market need.

A second foam system which has achieved commercial success is that of foamed polyvinylchloride (PVC). It can be suitably plasticized to yield a flexible cellular product. These materials are higher density (12 to 20 lbs/cu ft) than polyurethanes (as low as 1–2 lbs/cu ft). Vinyl foam is expanded by the use of chemical foaming agents near the melting point of PVC. These expand to generate the cellular structure. Deficiencies of PVC foamed systems are the difficulties of achieving low foam densities, lack of strength of the foams at high temperature (since they are not chemically cross-linked, these systems can collapse without close control of foaming temperature) and restriction of the foaming concept to a single base polymer, that of PVC.

Thermoplastic foams include a number of rigid and semi-rigid plastic materials such as unplasticized polyvinylchloride, polypropylene, polystyrene, etc. Polystyrene represents the largest volume product in this class of materials. Polystyrene foams can be prepared using several foaming techniques. These involve impregnation of the polymer with a foaming agent and heating the polymer-foaming agent mixture to a temperature above the softening point of the polymer. This temperature also must permit the foaming agent to evolve in gaseous form thus creating the cellular structure of the foam. It is clear that in the case of these thermoplastic foams the viscosity of the polymer has a major influence on the cell structure of the resulting foam. If the temperature is too low, a highly dense foam may result. If temperature is too high the foam may partially collapse. Thus, thermoplastic foams, unlike chemically crosslinked foams, suffer from a degree of temperature sensitivity whereby the viscosity of these systems above the polymer softening temperature varies greatly with temperature.

It is evident from this discussion that chemically crosslinked foams such as polyurethanes possess certain advantages, especially resistance to flow at elevated temperatures. However, such advantages are achieved at a substantial cost in complexity of chemical reactions, in processing problems, inability to reuse scrap, inability to refoam defective parts, etc.

On the other hand, conventional thermoplastic foams, such as polystyrene foams, polyvinyl chloride foams, ionic polymer foams of the prior art (for example, see U.S. Pat. No. 3,322,734), etc. possess the virtues of easy processability, reuse of scrap, and simplicity of the foaming operation. Yet these systems all possess the failing of poor dimensional stability at elevated temperature. It is evident that for both classes of systems, chemically crosslinked foams and thermoplastic foams, each possesses virtues and deficiencies which are inherent in their mode of preparation.

The foams described in the present invention may be characterized as follows:

a. The products of the present invention behave at certain temperatures as if they were chemically cross-linked, yet they are not; consequently they possess good dimensional stability.

b. At sufficiently high temperatures the products of the present invention behave as true thermoplastics.

c. The block or graft copolymers employed in the present invention all possess at least two softening points, both above room temperature.

d. These products are inherently reprocessable.

e. If desired, the products of the present invention can be plasticized with selected solvents to create flexible foams.

It is apparent that the present invention provides some of the advantages of thermoplastic foams, and yet retains some advantages of chemically crosslinked foams.

SUMMARY OF THE INVENTION

It has now been discovered that novel foamed polymeric products may be prepared by foaming a mixture comprising a multi-phase block or graft copolymer and a suitable foaming agent at an elevated temperature above the softening point of the highest softening polymer block. The use of a multiphase block or graft copolymer having the characteristics given below provides a polymer melt which can be readily processed at elevated temperature but which can be cooled to a temperature below the softening temperature of the higher softening block (but above the softening temperature of the lower softening block) to yield a flexible foamed product. Under these conditions, a physically associated, i.e., crosslinked, foamed product results, which is flexible but no longer in a molten condition. Consequently, it can be further processed into any desired shape by stamping, compressing, calendaring or, alternatively, cooled and treated as a conventional foam. When cooled to a temperature below that of the lower softening block, the foam appears similar to conventional plastic foams.

The instant invention is related to U.S. Ser. No. 199.799, filed Nov. 17, 1971 in the names of R. D. Lundberg and H. S. Makowski, but differs therefrom, in that the instant invention relates to a novel multiphase copolymer foam, and the process for making said foam, while U.S. Ser. No. 199,799 discloses and claims a process for fabricating articles from the same copolymers by a three step process wherein said article formed into a desired shape at a temperature above the softening point of both copolymer phases, reformed to a second desired shape at a temperature between the softening point of the phases, and cooled to a temperature below the softening point of both copolymer phases.

It is apparent from this discussion that the presence of two phases, both softening above room temperature, is responsible for unusual dimensional stability of these foams. Thus, if we define the following temperatures:

$T_L$ = softening temperature of the lower softening block, $T_H$ = softening temperature of the higher softening block, $T_m$ = a temperature which is higher than $T_L$, and lower than $T_H$ It is apparent that at $T > T_H$ these polymers can be processed in a manner similar to conventional thermoplastic foams; at $T = T_m$ these products will behave as flexible, physically crosslinked foams, and at $T > T_L$ these foams will behave as rigid plastic foams. A major distinction between the products of this invention and the thermoplastic foams of the prior art, is that at elevated temperatures (from about $T_L$ to about $T_H$, and even slightly higher) these foams behave as if they were chemically cross-linked. This very valuable property is highly prized in the fabrication of foams possessing a memory and in providing dimensional stability across a wide temperature range.

French Pat. No. 1,576,598 broadly discloses multiphase polymers which may be random, block or graft copolymers wherein either both monomers would produce a resinous homopolymer or one would produce a resinous and one an elastomeric homopolymer. For purposes of the instant invention, it has been discovered that random copolymers and copolymers wherein any monomer unit would produce an elastomeric polymer are not applicable. In fact, the only polymers applicable to the instant invention are graft or block copolymers falling within the following general structural formulae:

Block

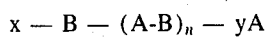

where $x$ and $y = 0$ or 1, $n \geq 1$, and $y = 1$ when $n = 1$.

Graft

where $m > 1$, wherein polymer blocks A and B are each thermoplastic resins having different softening points (i.e., differing from one another by at least 10°, preferably by at least 20°, and most preferably by 50°–100°C.), wherein B is the lower softening block and is present in from about 50 to as high as about 97 wt. percent of total polymer, more preferably about 50 to about 90 wt. percent. The presence of the B block at about 50 wt. percent or higher insures that it will constitute the predominate phase and therefore be present largely as the continuous phase while A block will be the dispersed phase or (domain). In order that distinct phases be present in the copolymer, each polymer block should contain at least about 10 and preferably 50 or more monomeric units. It is also noted that B must be an interior block in a block copolymer or form the backbone in a graft copolymer in order to function in the instant invention. Further, the softening point of each block must be substantially above room temperature (25°C.), i.e., at least about 10°C. above. Therefore, the lower softening block should have a softening point of at least 35°C., and should, for practical purposes, not exceed about 260°C., although, of course, higher softening points are also applicable. Preferably, the softening point of the lower softening block should be at least about 50°C. to about 150°C.

By softening point is meant either the crystalline melting point or the glass transition temperature of the polymer block.

Methods of preparing block and graft copolymers are well known and need not be recited here. In order to determine suitable monomeric constituents for a block or graft copolymer as described above, one need only determine the softening points of the homopolymers produced from these monomers and having the appropriate number of monomeric units. A blend or mixture of these homopolymers must also exist in separate distinct phases at ambient temperatures in order to insure that a copolymer prepared from selected monomeric constituents would be multiphase and useful in the instant invention.

Although these polymer blocks can best be prepared by direct polymerization techniques, these various blocks can be suitably modified by plasticization to change the softening points of the respective blocks as long as the resulting product is a multiphase product, each phase of which obeys the softening point criteria described above.

Representative examples of copolymers which are suitable for use in the instant invention provided they fall within the above-defined general formulae are: poly t-butyl-styrene-polystyrene polychlorostyrene-polystyrene, polycaprolactam-polystyrene, polycaprolactone-polystyrene, polyethylene oxide-polystyrene, polyamides, i.e., (hexamethylene diamine-adipic acid copolymers or Nylon 6,6)-polystyrene, polypropylene-polyethylene, polybutene-1-polypropylene, polyethylene-poly 4-methylpentene-1, polymethacrylonitrile-polystyrene, polymethacrylonitrile-polyethylene oxide, polyethyleneterephthalate-polyphenylhydroxyether of bisphenol A, polyphenylhydroxyether of bisphenol A-polysulfone (from bisphenol A and dichloro diphenyl sulfone).

Preferable copolymers include: poly t-butylstyrene-polystyrene of the ABA type, crystalline polypropylene-polyethylene copolymers of the ABA type, polyethylene oxide-polystyrene copolymers, etc.

The preparative techniques for each of these polymer blocks is well described (see *Preparative Techniques of Polymer Chemistry*; Sorenson and Campbell, Interscience Publishers, 1968) and the means of combining these various blocks with each other is now well-known in the polymer art.

The foaming agents which may be used in the process of the instant invention are well known in the art and include compounds that decompose at the temperature of foaming to liberate gases, and the low boiling liquids which are converted into gaseous form by heating. Examples of foaming agents which decompose at specific temperatures to liberate gases include the following representative compounds for which the approximate temperature range of decomposition is indicated in parenthesis: sodium bicarbonate (160°–200°C), sodium bicarbonate and citric acid combination (0°C to 200°C), azobis formamide (160°–200°C), azobisisobutyronitrile (90°–115°C), diazoaminobenzene (90°–110°C), N, N'dimethyl-N,N'-dinitrosoterephthalamide (90°–105°C), N,N'-dinitrosopentamethylenetetramine (130°–190°C), toluene-4-sulfonyl hydrazide (100°–110°C), 4,4'-oxybis (benzene sulfonyl hydrazide) (120°–140°C), and similar compounds known in the art. (For example, see reference "Plastic Foams"; Vol. II, by C. J. Bennings, Wiley Interscience Publishers, 1969, Appendix A-II). From about 0.02 to 20 percent, preferably from 1 to 5 percent by weight, based on polymer, of these foaming agents are used.

The low boiling liquids which can be utilized are those which boil at a suitably low temperature to allow for convenient foaming. For example, these liquids must volatilize at a temperature where the polymer flows. When preparing a plastic foam, the boiling point of the liquids can be extremely low, even below room temperature, because if they are suitably dispersed in a solid plastic polymer they will not readily vaporize until the polymer reaches a temperature at which it flows. Examples of such suitable liquids are pentane, hexane, heptane, benzene, toluene, methylene chloride, trichloroethane, 1,2-dichloroethane and the like.

Similarly materials, which are gases at room temperature, may be employed include carbon dioxide, ammonia, dichlorodifluoromethane, sulfur dioxide, nitrogen and the like. Preferably the low boiling liquids are either solvents or partially soluble in the continuous polymer phase. For example, when a block copolymer in which the continuous phase is polystyrene is utilized in the instant invention, the foaming agent is preferably a liquid with some solubility in polystyrene. Preferably the low boiling liquid will have a boiling point of less than 200°C, more preferably less than 150°C.

Sufficient liquid or solvent must be used to provide a foam of the proper density. Under some circumstances this solvent will actually dissolve the polymer and in these cases, there will be a large excess of the solvent. In other cases where the low boiling liquid is only sparingly soluble in the polymer, only modest amounts are required. In general the low boiling liquid (foaming agent) will comprise from about 1 to about 300 weight percent of the total mixture, more preferably from about 2 to about 50 weight percent, and most preferably from about 3 to about 25 weight percent.

Very often in the preparation of commercial foam samples, nucleating agents are employed as additives to create a very uniform and small cell structure. These nucleating agents are well known to those versed in the art. Systems such as sodium bicarbonate and citric acid or calcium silicate are often employed. These additives can also be utilized in the foams produced in this invention.

The foams prepared in this invention can possess densities which vary widely according to the conditions under which they are prepared. Foam densities as low as 1.0 lb. per cubic foot or lower are feasible, and densities as high as 45 lbs. per cubic foot can also be achieved. Preferably foam densities of 2.0 lbs./cubic foot to 20 lbs./cubic foot are achieved. In general, to prepare low density foams higher foaming temperatures and increased concentrations of foaming agents are used.

The products of this invention develop their unique properties as a consequence of the physical association of crystalline or glassy polymer phases. The dimensional stability of these foamed systems at the elevated temperature, $T_m$, is a consequence of a dispersed phase or domain which is not above its softening point at this temperature. It is also possible to employ volatile solvents, which are selective solvents for the dispersed polymer phase (or A block) which lower the softening point of the A block prior to the foaming reaction. During the foaming process (which is conducted at a temperature above the boiling point of these selective solvents) said solvents are vaporized, thereby creating a foam structure and simultaneously increasing the softening point of the solvated A block and creating a foam of good dimensional stability, utilizing the physical crosslinks imparted by the A block. Suitable selective solvents within the scope of this invention are those which are substantially miscible with the A blocks of the polymers described herein, i.e. solvents which substantially dissolve a polymer corresponding to the A block, yet are sufficiently volatile so that they vaporize during the foaming process, (i.e., they possess a boiling point less than 150°C). For example, if a poly t-butylstyrene-polystyrene-poly t-butylstyrene block copolymer is employed (the A block is, of course, poly t-butylstyrene) suitable volatile solvents for the A block are pentane, hexane, heptane, octane, isooctane, decane, and the like. An amount of these solvents (2 to 25 weight percent) will decrease the A block softening point and yet readily vaporize during the foaming process, permitting the A block to achieve its high degree of strong physical association.

The advantage of reprocessing scrap foamed polymer results from the fact that the foamed products of the instant invention have physical crosslinks and not the chemical crosslinks known in certain of the prior art foams. The use of high temperature or a selective solvent disrupts these interactions, thus the foam behaves as any uncrosslinked foam; for example, it can be readily dissolved in appropriate solvents. After foaming, the solvent because of its volatility, is removed from the foamed products leaving behind the strong and temperature resistant physical crosslinks. Suitable solvents which will dissolve these polymers are readily determined by simple solubility tests. Suitable solvents for the poly t-butylstyrene-polystyrene-poly t-butylstyrene polymer are benzene, toluene, methylene chloride, tetrahydrofuran, etc.

This process is admirably suited to the preparation of foamed sheet (for example, in extrusion), foamed pellets and foamed molded samples. Furthermore, due to the excellent dimensional stability of the foamed plastic products, these can be heated subsequent to the foaming process and stamped or forged into complex foamed articles simply by a stamping and cooling cycle. The cooling of the plastic foamed article below its lower softening temperature permits the retention of complex configurations. Similarly this process permits the preparation of foamed articles which have a foamed surface of relatively high density, and an interior core of substantially lower density. Such foamed articles possess relatively high strength to weight ratios.

It is also feasible to utilize these rigid multiphase block or graft copolymers to prepare flexible foams. To do this it is necessary that a non-volatile selective solvent for the continuous polymer phase be incorporated into the polymer-foaming agent mixture. This can be done simply by dispersing the polymer into the nonvolatile (selective) solvent (plasticizer) by incorporating the plasticizer at elevated temperature. Thus by heating the polymer-plasticizer-foaming agent mixture the selective plasticization and foaming process can occur with the consequent result that a uniform flexible cellular product is achieved in a single step or, if desired, several sequential steps. The plasticizer is a relatively nonvolatile liquid which solvates only the B block of the multiphase copolymer. By "nonvolatile" is meant that the normal boiling point of the liquid should be in excess of at least about 120°C., preferably in excess of about 150°C., and most preferably in excess of above 200°C. If the plasticizer is too volatile, the plasticized foam would lose plasticizer with a resulting undesirable change in physical properties. Therefore, liquids with low vapor pressures are desired.

In order to determine which solvents are suitable for use as plasticizers in the instant invention, it is necessary to pick a material which is not only liquid and relatively non-volatile but also will solvate primarily the particular polymer phase desired. That is, the plasticizer must be capable of plasticizing the B block of the multiphase thermoplastic above the softening point of that block but must be incapable of substantially plasticizing the A block, i.e., no more than about 10 percent of the added plasticizer should be incorporated with the A block. A simple method for determining what liquids will be effective plasticizers for a given polymer phase in the present invention has been discovered. It has been found that the compatibility of a high molecular weight homopolymer with a given plasticizer is an excellent criterion to determine whether or not that polymer will be plasticized by the liquid medium employed when the polymer is used as a polymer block of the multiphase thermoplastic. As an illustration, a polystyrene-poly-t-butylstyrene-polystyrene block polymer may be considered. It has been discovered that those liquids which will dissolve poly-t-butylstyrene at a temperature near or above its softening point and which will not exude from this homopolymer at ambient temperature, and yet will not dissolve polystyrene homopolymer, are effective plasticizers for that system. However, liquids which are compatible with polystyrene (i.e., dissolve the homopolymer), are not effective plasticizers for the illustrated system because they will not selectively solvate the desired phase.

In other words, plasticizers for multiphase copolymers of the type described above containing polymer blocks A and B may be readily selected by the following simple test. One gram of homopolymer A and homopolymer B are each combined with 100 grams of the prospective plasticizer and each heated to a temperature near or above the softening point of the homopolymer and then cooled to room temperature. If homopolymer B dissolves under these conditions and homopolymer A does not, the liquid medium will make an acceptable plasticizer for the system.

Examples of suitable plasticizers for a polystyrene block are: dibutyl phthalate, dihexyl phthalate, dioctylphthalate, tributyl phosphate, etc. Suitable plasticizers for a poly(-t-butyl styrene) block are: paraffinic based oils, didecyl phthalate, ditridecylphthalate, etc. Suitable plasticizers for a block polymer of polyphenylhydroxy ether of bisphenol A are diethyl phthalate, dibutyl phthalate, and low molecular weight condensation polyesters of 1,4-butane diol and adipic acid, or 1,6-hexanediol and adipic acid, said polyesters being liquid and having viscosities at room temperature of 500 to 50,000 centipoises. Suitable plasticizers for a polyvinyl acetate block are diethyl phthalate, dibutyl phthalate, dihexyl phthalate, tributyl phosphate, etc.

The following examples are presented to further illustrate the instant invention.

EXAMPLE 1

Formation of TBS-S-TBS Block Polymer — ABA Type

A sample of a t-butylstyrene-sytrene-t-butylstyrene (TBS-S-TBS) block copolymer of the ABA type was prepared as follows. A one liter flask was oven dried, attached to a vacuum line and evacuated to 0.2 mm. mercury pressure for 20 min. at about 150°C. to effectively remove trace amounts of moisture. The flask was cooled and 500 ml of pure dry benzene was added. To the benzene was added 14.89 ml of 0.1344N n-butyllithium in heptane. The reaction temperature was maintained at about 50°C., and 35.5 grams of purified dry t-butylstyrene was added to the solution. The colorless solution quickly turned bright orange and the temperature rose 5° to 10°C. due to the heat of polymerization. The reaction was permitted to stir for 30 min. at 65°C. The reaction vessel was then cooled to about 50°C. and 163.1 gms of styrene was added and stirring was effected for 45 min. Some cooling of the reaction flask was necessary to prevent overheating of the reaction. Then 35.4 grams of t-butylstyrene was added at 60°C. and the entire contents were stirred at 60° to 70°C. for 40 min. The contents of the flask were then precipitated in methanol (a large excess of several liters), ground up in a high speed blender, filtered, and dried in a vacuum oven at 80°C. overnight. The final yield was 234 grams, which is about quantitative. The number average molecular weight of the final polymer chain is estimated to be 116,700. The first t-butylstyrene block is estimated to be 17,700 in number average molecular weight, the center styrene block is estimated to be 81,400 in number average molecular weight, and the third block of t-butylstyrene is estimated to be 17,600 in number average molecular weight. The softening points in the blocks of these polymers are somewhat dependent on the method of measuring. Using a duPont Thermo Mechanical Analyzer (TMA) 2 softening points were observed with this polymer, one near 100°C. for the polystyrene block, and one near 140°C. for the poly-t-butylstyrene block. (Heating rate of 10°C/min. with 5 gram weight on probe.) The softening point of high molecular weight polystyrene homopolymer is estimated to be 100° to 110°C., while for poly-t-butylstyrene homopolymer the softening point is estimated at 140° to 150°C. Gel permeation chromatography demonstrated the essential absence of either homopolymer or diblock polymers.

Formation of TBS-S Block Polymer

Using the procedure described above a two block copolymer containing approximately 70 percent styrene was prepared by charging in 1000 ml benzene containing 11.09 ml of 0.1108 N n-butyllithium in heptane, 142.7 gms pure, dry styrene, then after about 30 min. 59.9 gms of pure dry t-butylstyrene was added. The polymerization was conducted for about 1 additional hour and worked up as above. The number average molecular weight of the polymer is estimated to be 164,500, with the styrene block estimated to be 116,200 and the t-butylstyrene block estimated at 48,300. The intrinsic viscosity in toluene at 25°C. is 0.61. Gel permeation chromatography measurements demonstrated the essential absence of homopolymer contamination.

Formation of S-TBS-S Block Polymer — BAB Type

Using the same procedure outlined above 11.14 ml of 0.1108 N-n-butyllithium was added to 1000 ml benzene followed by 69.7 gms styrene which was polymerized, followed by 60.1 gms t-butylstyrene which was polymerized, followed by 70.1 gms styrene which was polymerized. The reaction mixture was worked up as above. The various block molecular weights were estimated at 55,700, 48,100, and 56,500 and the number average molecular weight of the product was estimated at 160,300. The intrinsic viscosity in toluene at 25°C. was 0.68. The final styrene composition was about 70 percent distributed equally at the ends of the polymer molecule, and 30 percent t-butylstyrene as the center block. Gel permeation chromatography demonstrated the essential absence of either homopolymer or diblock copolymer.

EXAMPLE 2

Comparative tests were run comparing the three block TBS-S-TBS copolymer (ABA type) with the two block TBS-S copolymer (AB type), and the three block S-TBS-S copolymer (BAB type) of Example 1 and with polystyrene homopolymer. The results of these tests demonstrate the necessity for employing multiphase copolymers having the structural arrangements set out heretofore and the inapplicability of a two block multiphase system in the process of the instant invention.

The four polymers were investigated on an Instron rheometer at 120°C. to determine tensile strength at yield, tensile strength at break, and elongation, which are indications of "melt" strength of the system.

The polystyrene sample behaved as a very viscous melt; i.e., exhibited no yield strength, no breaking point and just continuous stretching of the sample.

The results of the respective block copolymers were as follows:

| 3-Block — ABA Type | | | |
|---|---|---|---|
| Yield Point | | Break Point | |
| Strength (psi) | Elongation (%) | Strength (psi) | Elongation (%) |
| 303 | 13 | 381 | 437 |
| 237 | 14 | 427 | 405 |
| 221 | — | 303 | 453 |
| Average 253 | 13.5 | 371 | 432 |

| 2-Block | | | |
|---|---|---|---|
| Yield Point | | Break Point | |
| Strength (psi) | Elongation (%) | Strength (psi) | Elongation (%) |
| 338 | 16 | 161 | 320 |
| 315 | 11 | 115 | 330 |
| Average 326 | 13.5 | 138 | 330 |

| 3-Block — BAB Type | | | |
|---|---|---|---|
| Yield Point | | Break Point | |
| Strength (psi) | Elongation (%) | Strength (psi) | Elongation (%) |
| 1356 | 2.7 | 689 | 261 |
| 1448 | 2.7 | 643 | 195 |
| Average 1402 | 2.7 | 666 | 228 |

The significance of these results is as follows. The polystyrene homopolymer possessed essentially no significant strength above its melting point. Aside from polymer chain entanglement there were no forces which resisted the flow of polymer chains past each other; therefore, there was no restoring force active to provide a memory of the original shape. A quantitative measure of the restoring forces within a polymer can be provided by stress-strain relationships such as those obtained on an Instron testing machine. (Some representative examples of stress-strain curves for a number of different polymers are found in *Testing of Polymers*, Vol. I, Ed. by J. V. Schmitz, Interscience Publishers, p. 91, 92.) The tensile stress of a polymer measured under these conditions is reflective of the restoring forces within a polymer sample. If the sample has insufficient restoring forces, then the stress will diminish with increasing strain. By contrast, in order to provide a polymer which will possess sufficient strength to provide the desired dimensional stability at $T_m$, the stress (or tensile strength) at high strain should be higher than at low strain. This is also the desirable characteristic for a material to restore its initial shape on distortion or to resist flow.

It is also apparent that if a polymer is subjected to deformation beyond the stress which it provides at break, then the chemical or physical bonds holding it together will rupture and, in this event, a product will lose its capability to recover.

With this background, the significance of the stress-strain results for the 3 block TBS-S-TBS block copolymer may be shown. At low strain (or elongation) the polymer possesses a yield point of moderate stress, but on continued strain the strength (stress) continues to rise until the sample breaks. This increase in stress with increasing strain is a clear manifestation of physical association acting as crosslinks to restore the initial shape.

In the case of the 2-block system, after the moderate stress at low strain (elongation of 10–15 percent) the tensile strength (stress) then diminished substantially until the sample broke. This indicates that the styrene chains are essentially tied down in a rigid TBS domain (at 120°C.) only at one end and this permits the polymer chains to flow by each other much more readily than in the 3 block system. Such flow diminishes the restoring forces and makes such 2 block systems unsatisfactory in this invention.

These data demonstrate that a 3 block system is much preferred over a 2 block copolymer. While the 2 block system is considerably superior to the single phase homopolymer, we require the maximum restoring forces possible in order to preserve the integrity of domains at high temperatures and to provide the dimensional stability desired in this invention.

The results for the stress-strain behavior of a 3 block system of the BAB type (S-TBS-S) bear out the statements that the center block must be the lower softening one to achieve the stress-strain characteristics and high temperature behavior required for the process of the instant invention. Again it can be seen that the tensile strength or stress of this sample (with a high softening center block) at yield is higher than at the break point. This is typical of a plastic (and nonrecoverable) stress-strain curve. In all cases where this behavior is obtained there will be an irreversible deformation which is the result of polymer flow and therefore a manifestation of poor dimensional stability.

EXAMPLE 3

Reversible Compaction of Rigid Foam 5.0 gms. of the TBS-S-TBS block copolymer prepared in Example 1 was combined in powdered form with 0.5 gm $NaHCO_3$ and placed in a plunger type mold with a 1/16 inch orifice drilled in the side to permit extrusion of a molten plastic rod when pressure is applied to the hot mold. The entire mold was heated to 380°F. (193°C.) and extruded under 1 ton pressure in a Carver Laboratory Press. The resulting extruded rod foamed as it left the orifice and extruded to about 1/10 inch in diameter. It was white, and microscopic examination showed it to be truly foamed. Density measurements showed a density of 0.5 gms/cc.

A small piece of this foamed rod was measured to yield the following dimensions:

| | |
|---|---|
| length: | 1.0 inches |
| diameter: | 0.095 inches |

This small cylinder was placed in a 130°C. forced air oven for 10 minutes, then removed and placed between 2 preheated flat platens at about 135° to 140°C. (275° to 285°F.) (a temperature between the softening points of the blocks) for 10 minutes at 1,000 psi (indicated pressure) on a laboratory press. Two thin sheets of Mylar film (biaxially oriented polyethylene-terephthalate) were used to prevent metal contact with the sample. The sample was then cooled in the compressed state. The final dimensions of the molded and cooled piece were:

| | |
|---|---|
| length: | 1.06 inches |
| width: | 0.20 inches |
| thickness: | 0.020 inches |

This was a clear thin plaque except for some particles of inorganic agent still observable. The strength appeared good with no obvious bubbles.

This same sample was placed in an open mold large enough to permit it to reexpand and the mold was placed back between the platens at 135° to 140°C. for 30 minutes with no pressure. At the end of that time it was observed that the pressed plaque nearly regained the original dimensions:

| | |
|---|---|
| length: | 0.835 inches |
| diameter: | 0.094 inches in 1 direction |
| diameter: | 0.066 inches in another direction |

Whereas the original foamed rod was truly cylindrical in shape, the reexpanded shape was not perfectly cylindrical, being that of a slightly flattened cylinder. Thus, if a plane intersected this shape perpendicular to its length the intersected figure represents an ellipsoid. The two diameters above represent the lengths of the two axes of this ellipsoid. This Example demonstrates molding of a multiphase block copolymer according to the process of the instant invention. It also demonstrates that the first attained shape (i.e., the rigid foam) may be readily and almost recreated completely by simple heating.

EXAMPLE 4

The three copolymers described in Example 1 (TBS-S-TBS), (S-TBS), and (S-TBS-S) all containing about 70 percent styrene were foamed to create cellular foams with estimated foam densities of about 0.3 gms/cc. (lbs. ft$^3$). Sections of each of these foamed materials were removed and the thickness measured with an accurate thickness gauge. Then the foams were simultaneously subjected to temperatures of about 275° to 280°F., between the platens of an electric press with thin sheets of Mylar film (a biaxially oriented polyethylene terephthalate) to prevent sticking and after 10 minutes to permit thermal equilibrium, the samples were exposed to 2,000 psi indicated platen pressure. This high pressure was believed to be greater than the tensile strength of the polymers at these temperatures; however, even under these conditions there should be sufficient restoring forces in the samples to provide a certain proportion of recovery. The percent recovery of these 3 samples should provide a quantitative measure of the restoring forces — remaining after compaction.

The samples were cooled under pressure and measured, then placed back between the platens at 285° to 295°F. without pressure. After 30 minutes of exposure to this higher temperature the thickness of the samples was reexamined. The findings are presented below.

| Sample | Initial Thickness | Thickness After Compaction | Final Thickness | (a) % Recovery |
|---|---|---|---|---|
| TBS-S-TBS | 0.136 | 0.030 | 0.070 | 52 |
| S-TBS | 0.239 | 0.036 | 0.045 | 19 |
| S-TBS-S | 0.165 | 0.020 | 0.035 | 21 |

(a) % Recovery is expressed as ( $\frac{\text{Final Thickness}}{\text{Initial Thickness}} \times 100$ )

This experiment demonstrates that even under conditions where partial destruction of the bonds would be expected (due to chemical bond breakage or disruption of the physical association) there is a very substantial recovery in the TBS-S-TBS case. Clearly, in the case of the 2 block system recovery is substantially less; similarly, the 3 block system with the higher softening center block recovers only a minor portion of the initial shape.

Of course, if one is to achieve nearly quantitative recovery, the forces on the polymer sample should be such that at a given temperature they do not exceed the tensile strength of the particular sample at break. While this is often difficult to determine from theory, a few experiments should quickly define the proper temperature and pressure conditions for optimal recovery.

EXAMPLE 5

This Example demonstrates the preparation of a foamed product utilizing a 3 block copolymer in which the center block is suitably plasticized in order to create a multiphase plastic. The ABA block polymer was a polystyrene-poly t-butylstyrene-polystyrene copolymer in which the center block (TBS) comprised 70 percent by weight of the polymer mass, and the terminal blocks each represented 15 percent by weight of polystyrene blocks. This 3 block copolymer in the unmodified state has a center block which softens at 140° to 150°C. while the polystyrene terminal blocks soften near 100°C. Clearly this system is not satisfactory to prepare the foams of this invention. However, selected plasticizers will solvate the center block in a selective manner and thereby decrease the softening point of that block below that of the terminal blocks. 4 parts of the 3 block copolymer containing 20 percent by weight of an oil (said oil having an average molecular weight of 500, based on paraffinic and naphthenic hydrocarbons with a specific gravity of 0.885 measured at 15.6°C., and with a kinematic viscosity measured at 20°C. of 240 cs.) was dissolved in 25 parts of methylene chloride. Then 0.20 parts of azo-bis(2-methylpropionitrile) were added as a suitable foaming agent. The resulting solution was then evaporated to essential dryness at room temperature and then dried overnight in a vacuum oven at 32°C. to remove trace amounts of solvent.

The resulting polymer mass was then inserted into a cylindrical compression mold which had a small orifice (1/10 inch) drilled into the side of the die. Under sufficient heat and pressure this permitted polymer to flow as a uniform monofilament in a controlled manner. This mold was heated to 130°C. between the platens of an electric press, and the polymer-plasticizer-foaming agent mixture placed in the die. As the sample became hot, pressure was increased on the mold and finally when the temperature had reached 120°–130°C. the pressure was increased. A foamed strand was extruded directly from the orifice in a continuous manner. When cooled the product was a white rigid foam. The foam density was estimated to be about 0.5 gms/cc or about 30 lbs/cubic foot.

EXAMPLE 6

This Example demonstrates the preparation of a block copolymer of an xB-(AB)$_n$-yA type containing about 70 weight percent polyethylene oxide. To an evacuated one-liter flask equipped with suitable stirring, condensers, and a nitrogen atmosphere, was added 500 ml freshly distilled tetrahydrofuran and 0.01407 moles of a potassium dianion of α-methyl styrene tetramer. The contents were cooled to −20°C. and 45 g pure styrene monomer was added. The styrene immediately began to polymerize and the reaction was conducted for 3½ hours. Then, 105 g of ethylene oxide was added. The polymerization of ethylene oxide was conducted for 24 hours. (The molecular weights of the polystyrene blocks and the polyethylene oxide blocks were not known exactly in this case because that is dependent on the efficacy of the initiator with each species. It is believed that the polystyrene block was about 5,000 and the PEO blocks on each end were estimated to be about 5,500 each.) Of course, after the coupling reaction the polyethylene oxide blocks effectively doubled, that is to 11,000 molecular weight. At the end of 24 hours, 3.36 g of sebacoyl chloride was added dropwise as a coupling agent over a 5-hour period. The viscosity of the solution appeared to increase. The entire solution was precipitated in a several-fold excess of n-heptane, and the powder dried overnight in a vacuum oven (30°–40°C.) The yield was 138 g of block copolymer, with a number average molecular weight of 33,000 as established by Gel permeation chromatography.

EXAMPLE 7

This Example illustrates the preparation of a foamed multiphase plastic consisting of hydrophobic and hydrophilic phases. The polystyrene-polyethylene oxide block copolymer of the previous Example was compression molded into thin plaques about 0.028 inches thick. These were subdivided further into pads about ¼ inch wide and ¼ to ½ inch long and placed into a glass pressure vessel which was then cooled to −78°C. to condense about 25 ml of dichlorodifluoromethane (Freon 12). This was capped and held for 3 days at room temperature in order that the small pads absorbed an equilibrium amount of Freon 12.

Following 3 days the Freon 12 was rapidly evaporated and the small pads removed. They appeared about the same as before exposure to the Freon 12. A rectangular pad of 0.052 g weight and with dimensions of 0.0285 × 0.272 × 0.474 inches was dropped into boiling water. Immediately a foam resulted and in 15 seconds the sample was removed, measured and weighed. The weight was 0.110 g and the dimensions were 0.039 × 0.438 × 0.625 inches. The product was opaque, strong, flexible and possessed excellent cell structure. Calculations reveal a foam density of this product to be approximately 35 to 40 lbs. per cubic foot. When dried the resulting product was then a rigid foam, retaining the rectangular configuration. The dried foam could be swollen with water, and subsequently dried, with this cycle being reproduced numerous times.

In general, the foams of this invention have unique processing properties in that, at $T > T_H$ these foams behave much as conventional thermoplastic foams, that is, they can be reprocessed, or extruded and handled as plastic melts above their softening temperature, but at temperatures $T = T_m$, these foamed materials are dramatically different. At $T = T_m$ these foams can be stamped, vacuum formed, molded or deformed, then cooled below $T_L$, to provide a foamed configuration of the desired shape. The excellent dimensional stability conferred by the physical cross-links permits these operations without the foam collapse observed in plastic foams of the prior art when held above their softening temperatures for extended periods of time. For example, this improved dimensional stability permits the extrusion of multiphase foamed pellets of low density at $T_H$, followed by compaction of these pellets to high density material at $T_m$, immediately followed by a cooling step to $T_L$. The resulting product can then be conveniently shipped or placed in a suitable container and reheated to $T_m$, a process permitting the preparation of low density foamed product within a particular configuration or container. The advantages of this process are obvious especially when employed in closed spaces where good insulating characteristics or tightly packaged configurations are desired.

The foams of this invention also possess other desirable attributes not readily achievable with melt processable foams of the prior art. One of these is solvent resistance. Thermoplastic foams, for example polystyrene foam, when contacted with a solvent for polystyrene tend to collapse. This tendency is especially manifested when attempts are made to glue one piece of polystyrene foam to another piece of foam or to a substrate. Many solvent-based glues simply attack the polystyrene foam such that it is difficult, if not impossible, to obtain a strong, coherent joint. In addition, the accidental exposure of such thermoplastic foams to either solvents or heat can result in their undesirable collapse with unfortunate consequences. In contrast, the foams of this invention can exhibit substantially improved solvent and thermal resistance. As an example, a foamed material based on the homopolymer of ethylene oxide (i.e. polyethylene oxide) when submerged in water tends to collapse as the polyethylene oxide dissolves. However, a (polystyrene-polyethylene oxide) block copolymer foam of the type described in this invention (for example, 80 percent polyethylene oxide) does not dissolve. Indeed it absorbs water to become flexible, but when removed from the water and dried, subsequently reverts to a rigid foam. This dramatic difference in solvent resistance is a general characteristic of the multiphase block or graft copolymers of this invention. Of course, resistance to a particular solvent system will depend on the particular composition of the block copolymer employed. For example, a (polyamide-polystyrene) block copolymer possesses better resistance to toluene as a solvent, than does a block copolymer based on (poly-t-butylstyrene-polystyrene).

The characteristics of improved solvent resistance and better thermal resistance are highly desirable in foams employed in the appliance industry and in automotive applications. This improved environmental resistance is manifested in extruded foams, in foam slabs, in foamed pellets, in high density microcellular foams, and in low density, highly expanded foams of this invention.

The foams of this invention, because of their improved dimensional stability, are especially amenable to hot deformation processes. Thus, if the foams of this invention in sheet or slab form are heated to $T_m$, they can be readily compressed or stamped. If the foams are heated in a manner such that only the outside surfaces are at $T_m$ and the interior core is at $T_L$, then compression molding provides a foam whose interior is highly expanded but the compressed sides are high strength, high density, the entire product being a sandwich form.

What is claimed is:

1. A composition of matter which comprises a foamed product derived from a multiphase thermoplastic copolymer having an average molecular weight of at least 10,000, selected from the group consisting of copolymers represented by graft copolymers having the general formula

and block copolymers having the general formula $xB-(AB)_n-yA$ wherein n is an integer $\geq 1$, $m$ is $> 1$, $x$ and $y$ are 0 or 1, and $y$ is 1 when $n$ is 1, A is a thermoplastic polymer block, and B is a thermoplastic polymer block having a softening point of at least about 35°C., said softening point being at least 10°C. below that of the A block, and which comprises from about 50 to about 97 weight percent of said copolymer, said foamed product having a density of about 1.0 lb./cubic foot to about 45 lbs/cubic foot.

2. The composition of claim 1 wherein B is selected from the group consisting of polyethylene oxide, polyvinylacetate, polylactones, polyethylene, and polymethylmethacrylate and copolymers thereof and comprises greater than 50 percent by weight of said composition, and A is selected from the group consist of polystyrene, poly t-butylstyrene, polyvinyl toluene, polymethacrylonitrile, polyacrylonitrile, polyamides, polypropylene and copolymers thereof.

3. The composition of claim 1 wherein B is polyethylene oxide and A is a polyvinyl aromatic polymer block.

4. The composition of claim 3 wherein A is polystyrene.

5. The composition of claim 1 wherein B is polystyrene and A is poly t-butylstyrene.

6. The composition of claim 4 wherein B comprises from about 50 to about 95 percent by weight of said composition.

7. The composition of claim 4 wherein the B block has an average molecular weight exceeding 6,000 and the A blocks have a molecular weight exceeding 5,000.

8. The composition of claim 1 wherein the A and B blocks have an average molecular weight of at least 5,000.

9. The composition of claim 1 wherein said copolymer is an ABA type copolymer.

10. The composition of claim 1 wherein the B block softens from at least 50°C. to about 150°C. and the A block softens from at least 50°C. to about 260°C.

* * * * *